Fig. 2.

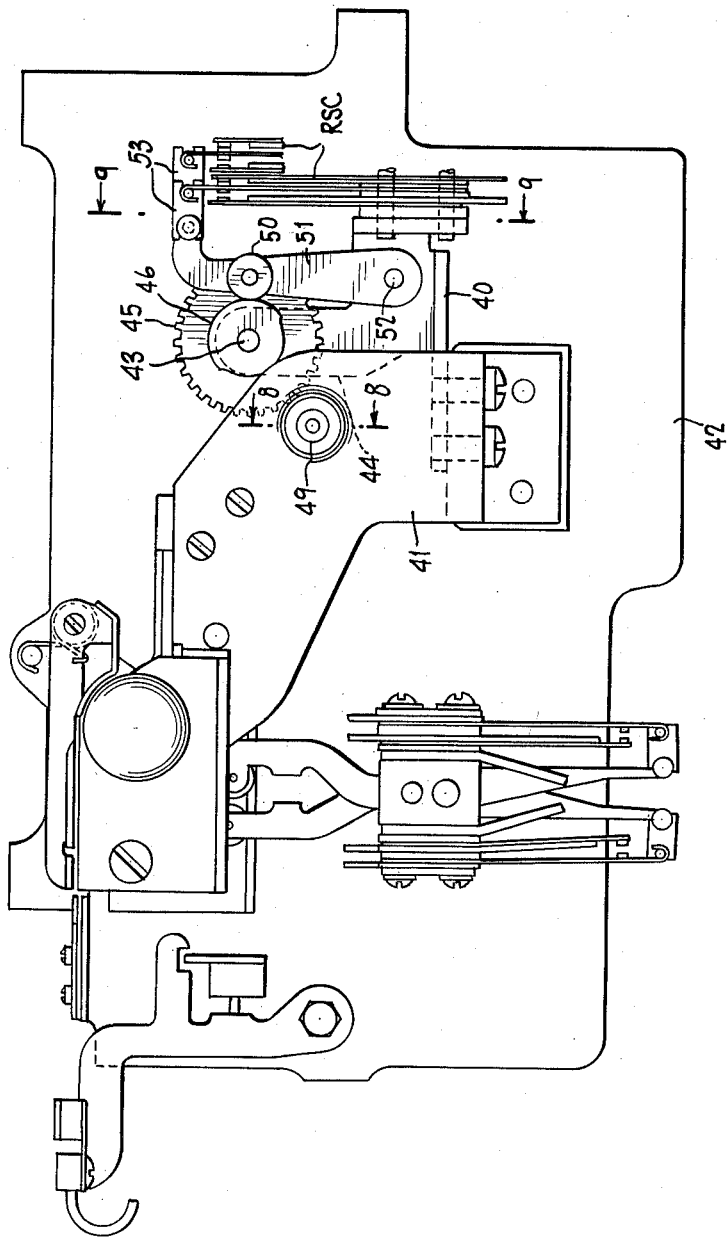

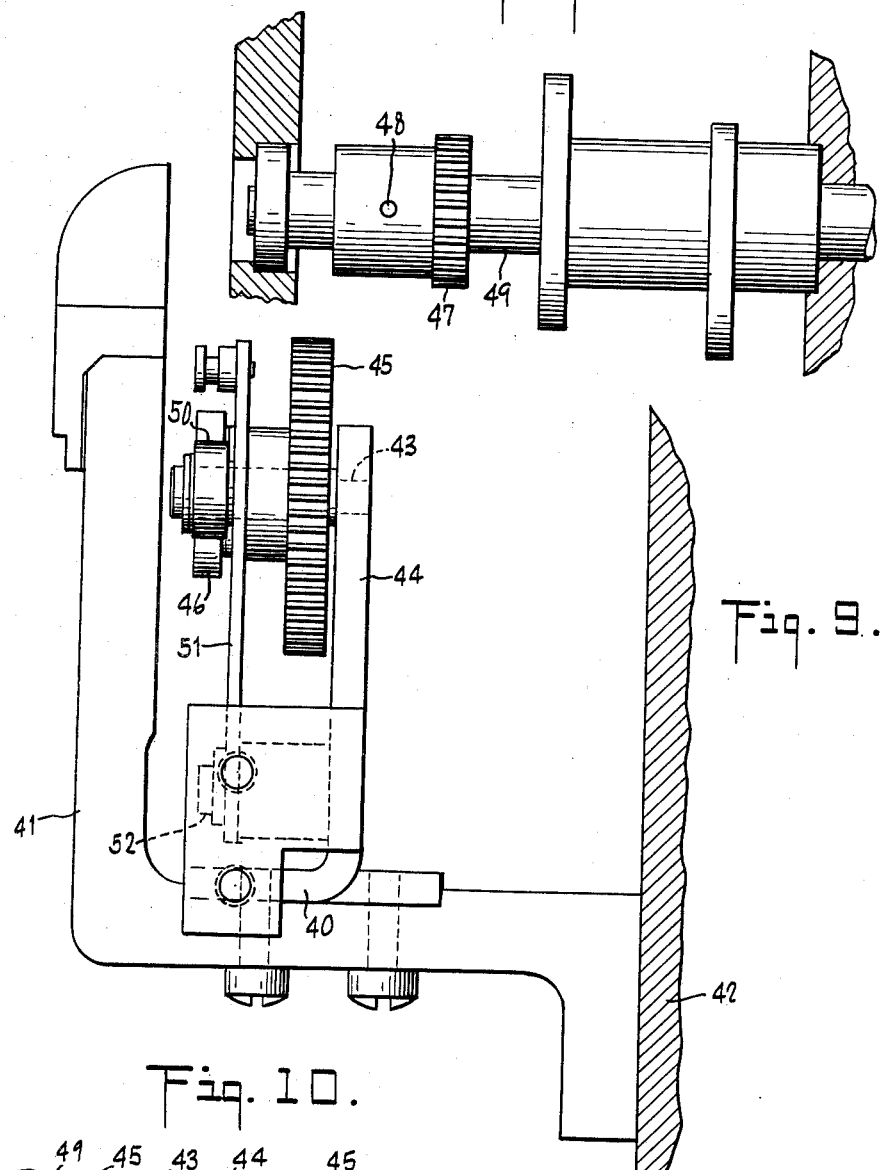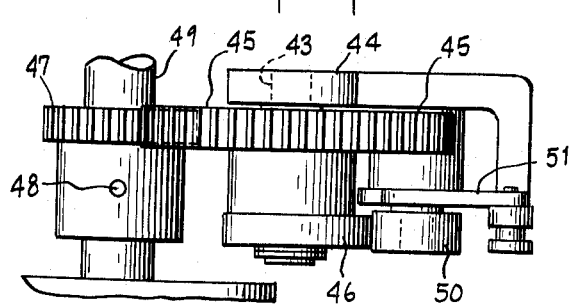

INVENTORS
EDWIN O. BLODGETT
JOHN V. NEEL
BY
John P. Harvey
ATTORNEY

United States Patent Office 3,108,253
Patented Oct. 22, 1963

3,108,253
CODED INFORMATION TRANSLATION SYSTEM UTILIZING PLURAL PARALLEL TO SERIAL DISTRIBUTORS
Edwin O. Blodgett and John V. Neel, Rochester, N.Y., assignors to Commercial Controls Corporation, Rochester, N.Y., a corporation of Delaware
Filed Aug. 10, 1960, Ser. No. 48,597
20 Claims. (Cl. 340—146.1)

The present invention relates to coded-information translation systems and, particularly, to such systems in which information is translated through communication channels having relatively narrow frequency band width. While the invention is of general application, it is particularly suited for translating information code-recorded in punched tape and for rerecording the information after transmission in identical punched-tape form and will be described in that connection.

Information is conventionally transmitted from one point and received at a remote point by the use of various forms of communication code. In one present day standard telecommunications system, information is translated in a code form using groups of five binary-form code bits having marking bits and spacing bits arranged in various combinations within each group to represent individual items of information. An improved form of coded-information translation system is disclosed in the copending application of Edwin O. Blodgett, Serial No. 608,110, filed September 5, 1956, now Patent No. 2,979,564, granted April 11, 1961. For convenience of reference, this patent will hereinafter be referred to as the Blodgett telecommunications patent. The system of this patent utilizes a novel transmitter or code "distributor" and a novel receiver or code "collector" structure enabling unusually high rates of information transmission and permitting the use of code forms having a maximum number of code bits exceeding the standard five-bit telecommunications code. It also utilizes a novel arrangement for rapidly and automatically detecting and indicating any inaccuracy of communication due to equipment malfunctioning or impairment of the transmission channel.

Commercial grade telegraph channels provide economical communication but are limited to a transmission rate of approximately seventy-five code bits per second. Telephone or voice quality communication channels have substantially wider frequency band width and accordingly provide higher rates of information transmission, but also are appreciably higher in cost. This higher cost often is economically warranted if the increased communication capacity of the channel can be substantially fully utilized. The Blodgett telecommunications patent system earlier mentioned conveniently reads data information from a punched paper tape wherein each information item is represented by a code-bit group having the code bits presented concurrently or in parallel, and after transmission records successive items of the received information as a concurrently presented plural-bit code-form punching of a paper tape. During transmission, however, simplicity of equipment and economy of transmission dictate that each code-bit group be translated over the communication channel with the code bits arranged in serial or sequential form. Thus appreciably more time is required for the transmission of each code-bit group than to read or record the group. There are many applications where it is desirable to retain the simplicity and economy of series or sequential code bit transmission of information, yet it is also desirable to maximize the rate of information transmission while retaining continuous monitoring over the accuracy of all communications to minimize or avoid error in the information as received at a distant point.

It is an object of the present invention to provide an improved coded-information communication or translation system of the type last described, and one which substantially enhances the quantity of information transmission within a given unit of time and accomplishes this with a minimum complement of communication equipment.

It is a further object of the invention to provide a novel coded-information translation system of the type described wherein each unit of the translation equipment employed is caused to operate substantially at its maximum translation rate so that a limited translation rate placed upon one unit, as by reason of the limited translation capacity of a communication channel, does not place a restriction on the higher translation rate of another and faster operating unit of the system.

It is an additional object of the invention to provide a coded-information translation system wherein information is translated essentially concurrently over plural communication channels yet one in which the accuracy of translation in all channels is continuously monitored by use of dual parity standards applicable not only to each code-bit group but also a code-bit sub-group within the group and all translation is automatically halted upon detection of error in the information translation in any channel.

Other objects and advantages of the invention will appear as the detailed description thereof proceeds in the light of the drawings forming a part of this application and in which:

FIG. 2 is a circuit diagram representing in simplified form the components utilized in effecting half-duplex communication of coded information over two transmission channels extending between a local and a remote point and including an error detection and control system to insure freedom from transmission errors which may occur in either of the transmission channels;

FIGS. 7–10 illustrate the construction of a one-half cycle cam and associated contacts used in the punched tape reader of the system herein described.

Figure 1:
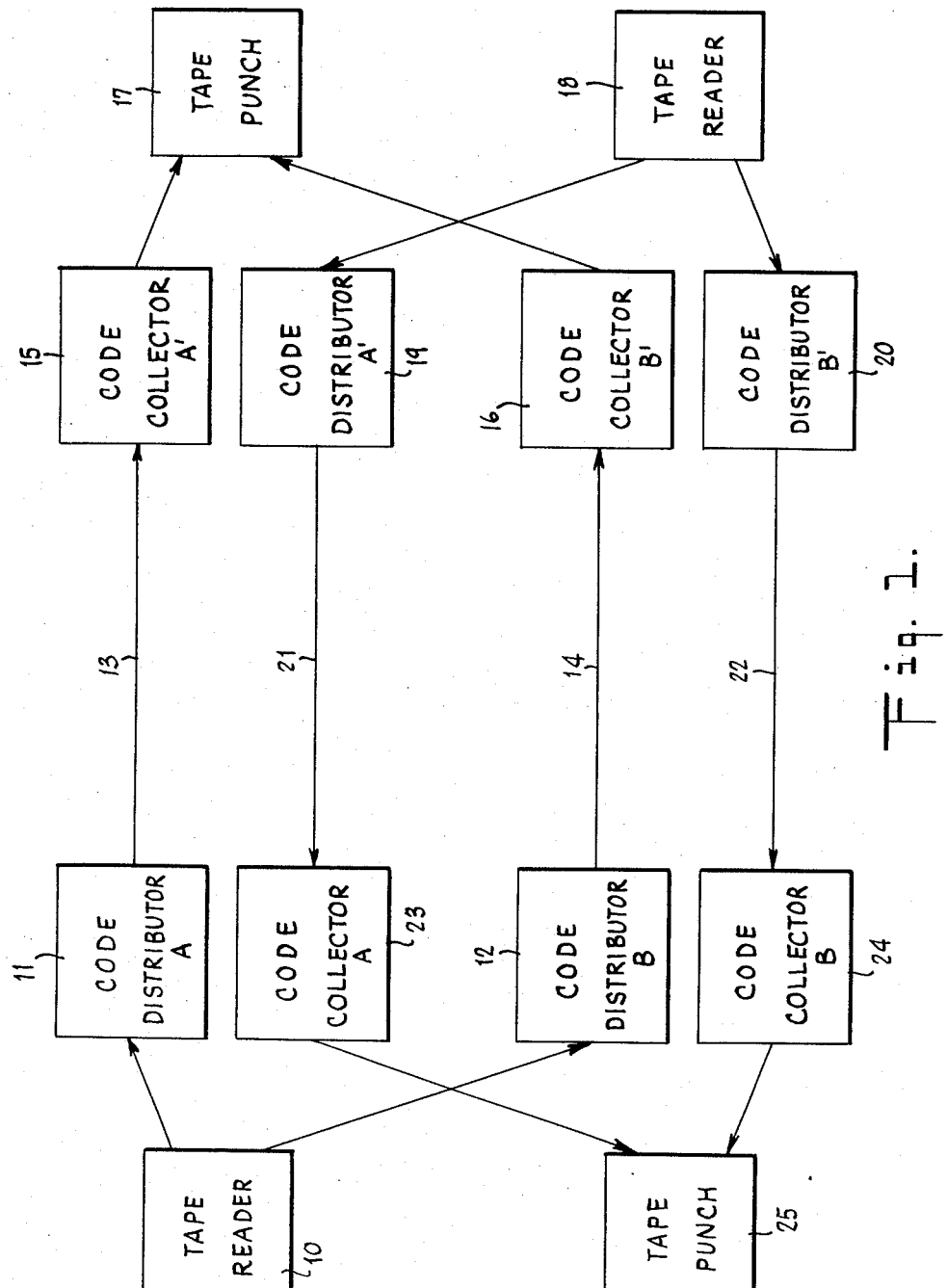
FIG. 1 represents schematically a complete coded-information translation system of the duplex form and embodying the present invention.

Referring now more particularly to FIG. 1, a translation system embodying the present invention is shown for simplicity of illustration as one of the full duplex form. One half of the system utilizes a punched tape reader 10 which reads coded-information from a punched tape recording medium and supplies successive items of data information alternately to two transmitters 11 and 12 (hereinafter referred to as "A" and "B" code distributors) for transmission over two communication channels 13 and 14 to two coded-information receivers 15 and 16 (hereinafter referred to as "A'" and "B'" code collectors). The coded-information received by the receivers 15 and 15 is alternately supplied to a punched tape recorder 17 which reproduces a punched tape identical to that read by the reader 10. The other half of the transmission system shown includes a tape reader 18, two "A'" and "B'" code distributors 19 and 20 coupled by two communication channels 21 and 22 to two "A" and "B" code collectors 23 and 24, and a tape punch 25.

Except for certain differences hereinafter described, the readers 10 and 18 and punches 17 and 25 may have the constructions shown and described in the United States Blodgett Patent No. 2,927,158; each of the transmitters 11, 12, 19 and 20 and receivers 15, 16, 23 and 24, and the communication system in which all of these units are used, may have the constructions and modes of operation disclosed and described in the aforementioned Blodgett telecommunications patent. The prefered construction disclosed in the later patent includes the distributor 11 and collector 23 in one physical unit, and includes the distributor 19 and collector 15 in another physical unit and this would be true of the units 12 and 24 on the one hand and units 16 and 20 on the other hand. It is further pointed out in the patent last mentioned that full duplex operation may be provided by complement of equipment such as comprised by the units 10, 11, 15, 17 and channel 13 on the one hand and by units 18, 19, 23, 25 and channel 21 on the other hand, or half duplex operation may be effected by using a single transmission channel for all of these units.

For the full duplex system shown in FIG. 1, the punched tape reader 18 at the location of the tape punch 17 derives coded-information from a punched tape and supplies successive information items alternately to the two transmitters 19 and 20 for communication over the channels 21 and 22 to the remote receivers 23 and 24 which supply the received information alternately to the punched tape recorder 25. For half duplex operation, the units 11, 15, 19 and 23 would use and share only one of the transmission channels 13 or 21 as explained in the Blodgett telecommunications patent, and this would be true of the units 12, 16, 20 and 24 also which would then use and share only one of the channels 14 or 22. The communication channels 13, 14, 21 and 22 may be comprised by commercial grade telegraph channels of the type earlier mentioned, or may be comprised in conventional manner by sub-channels of limited frequency band width included within a telephone or voice quality communication channel.

Figure 2:
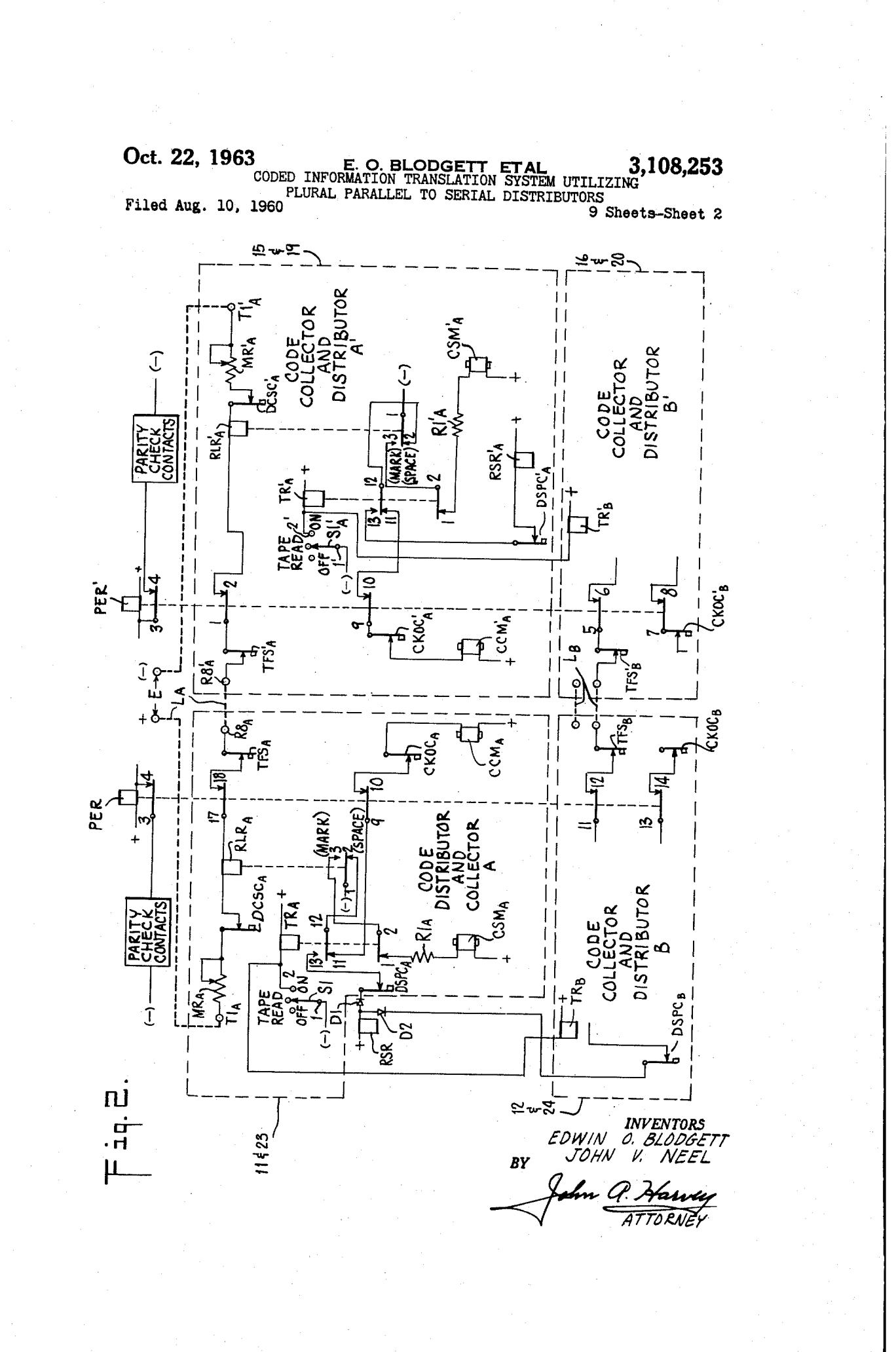

FIG. 2 shows in simplified form the electrical circuit arrangement by which information communication is effected in the half-duplex mode of system operation last mentioned and using only one transmission channel $L_A$ in place of the two channels 13 and 21 of FIG. 1 (this single channel extending between the transmitter-receiver units 11 and 23 of FIG. 1 and the transmitter-receiver units 15 and 19 of FIG. 1). FIG. 2 also indicates similar half-duplex mode of system operation by use of a single channel $L_B$ extending between the transmitter-receiver units 12, 24 and the transmitter-receiver units 16, 20 of FIG. 1. FIG. 2 particularly indicates the manner in which all communications are continuously monitored for dual parity error, and by which all communications are halted when error is detected in any communication channel. This general arrangement here shown is more fully described in the Blodgett telecommunications patent and accordingly will only briefly be considered with emphasis on the error detection and control arrangement. For convenience of description, the coded-information transmitter or distributor 11 and receiver or collector 23 of FIG. 1 are referred to hereinafter as a "code distributor and collector A" whereas the transmitter or distributor 12 and receiver or collector 24 of FIG. 1 are hereinafter referred to as the "code distributor and collector B." Similarly, the coded-information receiver or collector 15 and transmitter or distributor 19 of FIG. 1 is hereinafter referred to as the "code collector and distributor A'" and the coded-information receiver or collector 16 and transmitter or distributor 20 of FIG. 1 are hereinafter referred to as the "code collector and distributor B'." It will be noted from FIG. 2 that each of the code distributor and collector A and A' units utilize the same components so that components of the latter unit are identified by primed reference characters and numerals. Further, all such components utilize the subscript A to identify the component as one belonging to the A or A' code collector and distributor units. It will be understood that the B and B' code collector and distributor units utilize the same components and same circuit arrangement as the A and A' units, so that those components which are shown for the B code collector and distributor units are identified with the subscript B. The following description of the A and A' code distributor and collector units will be understood to apply in all respects to the arrangement and operation of the B and B' code collector and distributor units.

The distributor code selector contacts $DCSC_A$ of the A unit are included in a series circuit extending between the transmitter line terminal $T1_A$ and the receiver line terminal $R8_A$ of this unit. This circuit additionally includes an adjustable resistor $MR_A$ used to adjust the magnitude of current flowing through the transmission channel, the operating winding of a receiving line relay $RLR_A$, the contacts 17 and 18 of a parity error relay PER of an associated tape punch unit, and a tape feed switch $TFS_A$. The receiving line relay $RLR_A$ has transfer contacts 1, 2 and 3 which are moved to the "mark" position (closing the contacts 1 and 3) when the relay $RLR_A$ is energized, thereby to energize the collector selector magnet $CSM_A$ through the normally closed contacts 1 and 2 of a transmit relay $TR_A$ and a current limiting resistor $R1_A$. In the deenergized position of the receiving line relay RLR, its transfer contacts move to the "space" position (closing contacts 1 and 2) to energize either (1) a tape reader stop relay RSR through the distributor sampling period contacts $DSPC_A$ (closed from approximately 346° of one distributor cycle to approximately 13° of the next distributor cycle) if the transmit relay $TR_A$ is energized (by manual closure of a read switch $S1_A$) to close its contacts 12 and 13, or (2) alternatively to energize the collector clutch magnet $CCM_A$ through the collector knock-off contacts $CKOC_A$ and the contacts 9 and 10 of the parity error relay PER if the transmit relay $TR_A$ is deenergized to close its contacts 11 and 12. The parity error relay PER is normally energized by a manual tape feed operation, in a manner explained more fully in the Blodgett telecommunications patent, which initially conditions the equipment for operation and remains so energized through its hold circuit contacts 3 and 4 and a system of parity check contacts included in the tape punch unit and hereinafter shown and described in more detail.

The local transmitter-receiver unit components thus included in the series circuit between terminals $T1_A$ and $R8_A$ are connected through a two-wire transmission line $L_A$, energized by a potential source E, to the line terminals $T1'_A$ and $R8'_A$ of the remote transmitter-receiver unit having the same components included in the same circuit arrangement as described for the local transmitter-receiver unit.

Assume that transmission is to occur from the local transmitter-receiver unit to the remote transmitter-receiver unit, and assume further that the parity error relay PER of the local equipment and the parity error relay PER' of the remote equipment are energized as shown to condition both equipments for operation. The local tape read switch $S1_A$ is manually actuated to close its contacts 1 and 2 and thereby energize the transmit relay $TR_A$. Transmission starts with the distributor code selector contacts $DCSC_A$ of the local equipment and $DCSC'_A$ of the remote equipment closed for the reason that both collectors stand in their home or 0° position at this time. Thus a continuous transmission circuit is established and both the receiving line relay $RLR_A$ of the local equipment and the relay $RLR'_A$ of the remote equipment are energized to move their transfer contacts to the mark position (contacts 1 and 3 closed). The relay $RLR_A$ contacts 1 and 3 are ineffective to energize the collector selector magnet $CSM_A$ since this energizing circuit is interrupted by the now open contacts 1 and 2 of the transmit relay $TR_A$. For the assumed direction of transmission, the tape read switch $S1'_A$ of the remote equipment should be in its OFF position so that the associated transmit relay $TR'_A$ is deenergized to permit the energized line relay $RLR'_A$ contacts 1 and 3 to energize the collector selector magnet $CSM'_A$ of the remote equipment.

Now if the transmission channel circuit should be open for any reason at this time, the receiving line relay $RLR_A$ of the local equipment would be deenergized to close its contacts 1 and 2 and this would effect energization of the reader stop relay RSR through a diode rectifier D1 and the contacts 12 and 13 of the transmit relay $TR_A$ since the distributor sampling period contacts $DSPC_A$ are closed at the initiation of each distributor cycle. The function of the reader stop relay RSR when energized is to prevent operation of the tape reader, in a manner more fully explained in the Blodgett telecommunications patent, so that no transmissions can therefore be effected; its energization also effects drop out of the parity error relay PER as explained in this Blodgett patent. In the remote equipment, the receiving line relay $RLR'_A$ would under this assumed condition also be deenergized and its contacts 1 and 2 would energize the collector clutch magnet $CCM'_A$ through the contacts 9 and 10 of the punch error relay PER' and the collector knock-off contacts $CKOC'_A$. The collector would operate through one cycle but would not receive any code transmissions, and this would cause the punch parity check contacts to drop out the parity error relay PER' for reasons explained in the last-mentioned Blodgett patent. The latter also describes how an indicator light on the tape reader unit would thereupon become illuminated and remain so until (1) the read switch $S1_A$ has been turned OFF, (2) the remote parity error relay PER' has been manually reset to its energized position by a manual tape feed operation of the remote punch unit, and (3) the fault in the transmission line circuit has been corrected and the circuit continuity again established thereby to energize the receiving line relay $RLR_A$ and to deenergize the reader stop relay RSR. Thereafter the read switch $S1_A$ may be turned ON and transmissions started.

The operation of the local distributor is such that its contacts $DCSC_A$ are closed to initiate transmission of each code-bit group so that the transmission line $L_A$ is energized in turn to energize the remote receiving line relay $RLR'_A$ and thus energize the collector clutch magnet $CCM'_A$ of the remote equipment as earlier explained. During the transmission of a code-bit group, the collector contacts $DCSC_A$ are actuated at successive bit intervals either to closed or open circuit positions in conformity with the presence and absence of mark bits in the sequentially transmitted code-bit group, and the remote receiving line relay $RLR'_A$ accordingly closes its contacts 1 and 3 to energize the code selector magnet $CSM'_A$ for each mark bit received or to leave the latter deenergized for each space bit received. As explained in the Blodgett telecommunications patent, the cyclic operation of the remote code collector under control of the code selector magnet $CSM'_A$ is successively to set a plurality of collector transfer contacts (corresponding in number to the total number of code bits which may be received) either to a latched up position corresponding to the reception of a space code bit or to an unlatched position corresponding to a received marked code bit and thus temporarily store the received code-bit group in the latched and unlatched positions of these contacts. At the end of a code-bit group transmission interval, collector contacts close to cause the contacts thus set concurrently to energize individual punch magnets of the associated tape punch unit and to initiate a cycle of punch operation by which to record the received code-bit group.

It was previously explained in connection with FIG. 1 that successive code-bit groups read by the tape reader are supplied alternately to an A distributor and to a B distributor for transmission to remote A' and B' collectors and that the latter alternately supply the received code-bit groups to the tape punch. Accordingly, the operation of the tape read switch S1 in FIG. 2 to close its contacts 1 and 2 effects concurrent energization of the transmit relays $TR_A$ and $TR_B$ to condition both the A and B distributors for operation, whereas operation of the switch S1' to close its contacts 1' and 2' effects concurrent energization of the transmit relays $TR'_A$ and $TR'_B$ and thus condition the A' and B' distributors for operation.

As will be explained more fully hereinafter, the operation of the tape punch in recording each received code-bit group causes a corresponding actuation of a system of parity check contacts of which there is one contact assembly associated with and actuated by each punch pin in the manner disclosed and described in the aforementioned Blodgett Patent No. 2,927,158. These parity check contacts perform a dual parity check, in a manner presently to be described, on each received code-bit group and failure of either of these dual parity checks indicates an error in the received and recorded code-bit group. Any such error deenergizes the parity error relay PER associated with the recording punch, and as previously noted causes interruption of the electrical continuity of the transmission channel $L_A$ to energize the receiver stop relay RSR and halt further transmissions. It will be noted from FIG. 2 that the parity error relay PER includes contacts 11, 12 and 13, 14 in the B distributor and collector unit (the circuit arrangement of the latter, as previously noted, being identical to that shown for the A code distributor and collector unit); similarly the parity error relay PER' has contacts 5, 6 and 7, 8 included in the remote B' code collector and distributor unit (likewise having a circuit identical to that shown for the A collector and distributor unit). From this it will be apparent that a parity error, whether due to a code-bit group received by the A' collector and distributor unit or the B' collector and distributor unit, will interrupt the electrical continuity of both transmission channels $L_A$ and $L_B$ and immediately halt the tape reader operation by energization of the read stop relay RSR through the diode D1 by the A unit or the diode D2 by the B unit. Thus all transmissions are halted in response to an error in a received code-bit group, and operation is again resumed as previously explained by certain manual operations at the local and remote equipments.

Figure 3:
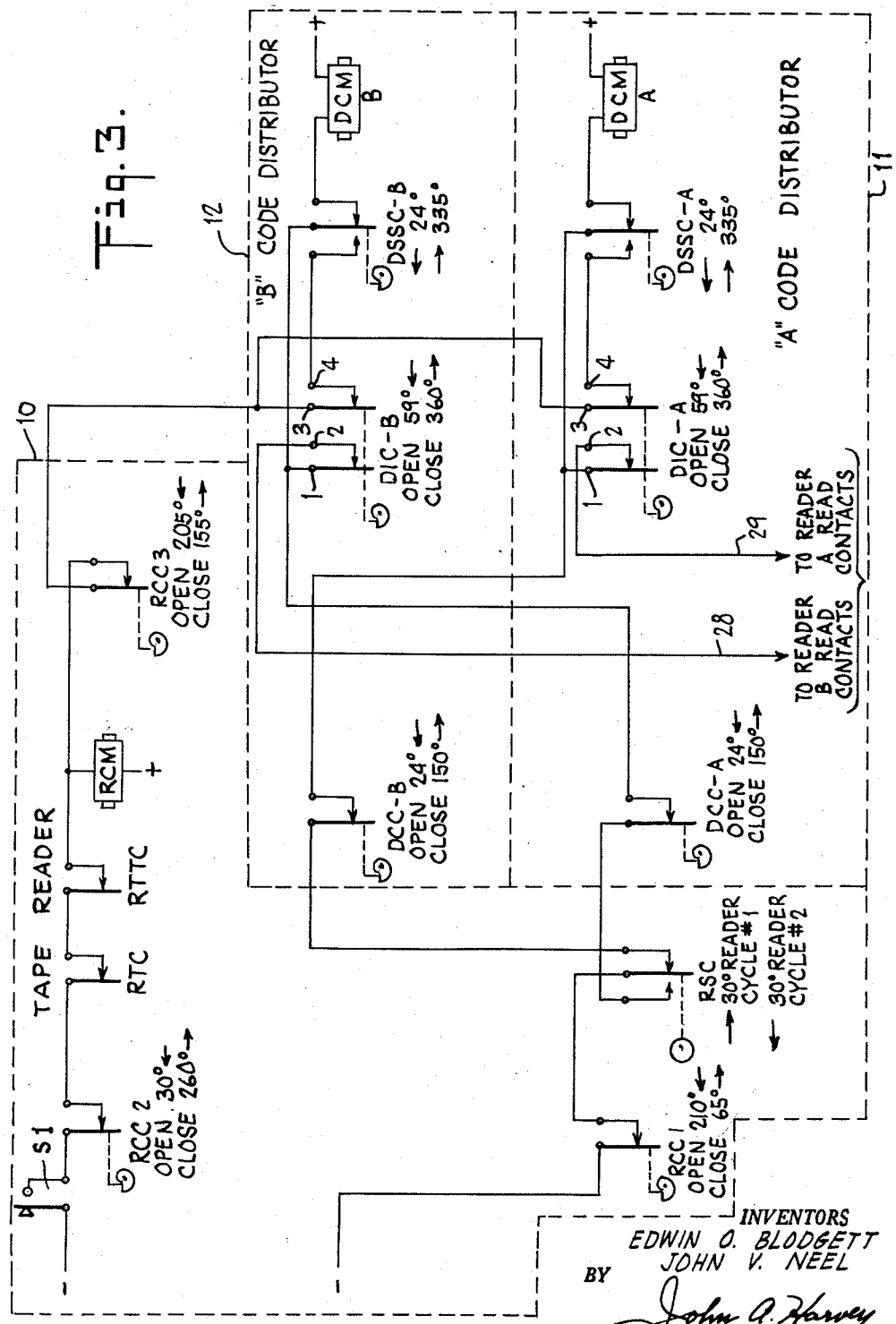
FIG. 3 is a circuit diagram representing the electrical intercontrol provided between the operations of a punched tape reader and two code transmitters or distributors used in the system of the invention.

As the tape reader reads successive code-bit groups and supplies them alternately to the A and B distributors for transmission, the cyclic operations of the reader and distributors are intercontrolled in a manner shown in FIG. 3. As explained in the Blodgett telecommunications patent, the tape reader has a 180° clutch by which the reader may be halted at its 0 cyclic position but normally operates from the 180° cyclic position of one cycle to the 180° cyclic position of the next operating cycle. In the 180° reader cyclic position, the reader pins sense each code-bit group recorded as punched apertures in a tape and those reader pins which sense a code bit aperture transfer reader contacts whereas those reader pins which find no code bit aperture maintain corresponding reader contacts in non-transferred position. The reader normally is halted at its home or 0° cyclic position, and upon closure of the switch S1 (FIG. 3) to initiate a reading operation the reader clutch magnet RCM is energized through reader tight tape contacts RTTC (normally closed but actuated to open circuit position should the tape being read become excessively tight for any reason), reader tape contacts RTC (which are closed whenever a tape is positioned in the reader in readiness to be read), reader contacts RCC2 which are closed from 260° of one reader cycle to 30° of the next reader cycle and thus are closed at the 0° reader cyclic position, and the switch S1.

Having thus initiated a cycle of reader operation, the reader contacts RCC2 open as noted at 30° of the reader cycle and thus deenergize the reader clutch magnet RCM so that the reader halts at its 180° cyclic position. As the reader progresses through this initial half cycle of operation, reader contacts RCC1 close at 65° of the reader cycle and apply energizing potential to the reader select contacts RSC (which transfer at 30° of the first and alternate reader cycles and again transfer at 30° of the second and alternate reader cycles) either to the A distributor contacts DCC or the B distributor contacts DCC. Assume for the moment that the reader select contacts RSC have transferred from their position shown in the drawing and thus energize the A distributor contacts DCC. The latter contacts are closed from 150° of one cycle of the A distributor to 24° of the next cycle of this distributor, and while closed energize the B distributor clutch magnet DCM through the B distributor contacts DSSC between 335° of one cycle of this distributor and 24° of the next cycle thereof.

This initiates a cycle of operation of the B distributor and at the same time energizes through an output circuit 28 and the contacts 1 and 2 of the B distributor contacts DIC a set of reader contacts of the tape reader which are electrically connected to the code magnets of the B distributor and by which the code magnets are energized in conformity with the code-bit group read by the reader. The code-bit group thus stored in the code magnets of the B distributor are transmitted by the latter as it continues through its cycle of operation, and at 24° of the distributor cycle the B distributor contacts DSSC transfer to energize the reader clutch magnet RCM through the contacts 3 and 4 of the B distributor contacts DIC and the reader cam actuated contacts RCC3 which are closed while the reader stands at the 180° position of its cycle. The reader clutch magnet RCM is thus energized from 24° to 59° of the distributor cycle when the distributor contacts DIC open, and the reader cam actuated contacts RCC2 now energize the reader clutch magnet RCM through the 0 cyclic position of the reader so long as the switch S1 and the contacts RTC and RTTC remain closed.

As soon as the reader has progressed to 30° of its next cycle, its contacts RSC transfer and at 65° of the reader cycle the contacts RCC1 now close to energize the A distributor clutch magnet DCM through the A distributor contacts DSSC as soon as the B distributor has progressed to 150° of its cycle to close its contacts DCC. The A distributor accordingly initiates a cycle of operation and energizes through contacts 1 and 2 of the A distributor contacts DIC an output circuit 29 which extends to an A set of reader contacts electrically connected to the code magnets of the A distributor and effective to store in the latter the code-bit group next read by the reader when it reaches its 180° cyclic position and halts. At 24° of the A distributor cycle, its contacts DSSC transfer and energize the reader clutch magnet RCM through contacts 3 and 4 of the A distributor contacts DIC and the cam actuated reader contacts RCC3 now closed at the 180° cycle position of the reader.

This releases the reader past its 180° cyclic position, and its cam actuated contacts RCC2 again energize the reader clutch magnet RCM past the 0 cyclic position of the reader so that the latter continues ON and halts at its 180° cyclic position to read the next code-bit group recorded in the tape. At the 30° cyclic position of this new reader cycle its cam actuated contacts RSC again transfer so that the cam actuated reader contacts RCC1 in closing at 65° of the reader cycle again energize the B distributor clutch magnet DCM to repeat the operation described.

It will accordingly be seen that the reader cam actuated contacts RSC effect alternate energization of the A and B distributor clutch magnets DCM during successive reader cycles, the energization of either distributor clutch magnet being dependent upon the completion of less than 24° or more than 150° of a cycle of operation of the other distributor as established by closure of its contacts DCC. It will further be evident that the energization of either distributor clutch magnet DCM is accompanied by concurrent energization of one of the output circuits 28 or 29 extending to the tape reader contacts and by which the distributor code magnets are energized to store a code-bit group read and temporarily stored in the reader contacts of the tape reader. It will also be evident that as each distributor progresses to 24° of its cycle, its contacts DSSC effect energization of the reader clutch magnet RCM to initiate a new cycle of reader operation. The reading rate of the reader is slightly higher than twice the operating rate of either distributor so that the reader halts briefly at its 180° cyclic position awaiting energization of the reader clutch magnet by one of the distributors. This alternate energization of the A and B distributors by successive reader cycles continues until the read switch S1 is manually opened, or the reader tape contacts RTC open when the end of a tape is sensed or the reader tight tape contacts RTTC open due to excessively tight tape conditions which may threaten to break the tape, whereupon the reader upon being released past its 180° cyclic position by one of the distributors halts at the 0° or home position of the reader.

Figure 4:
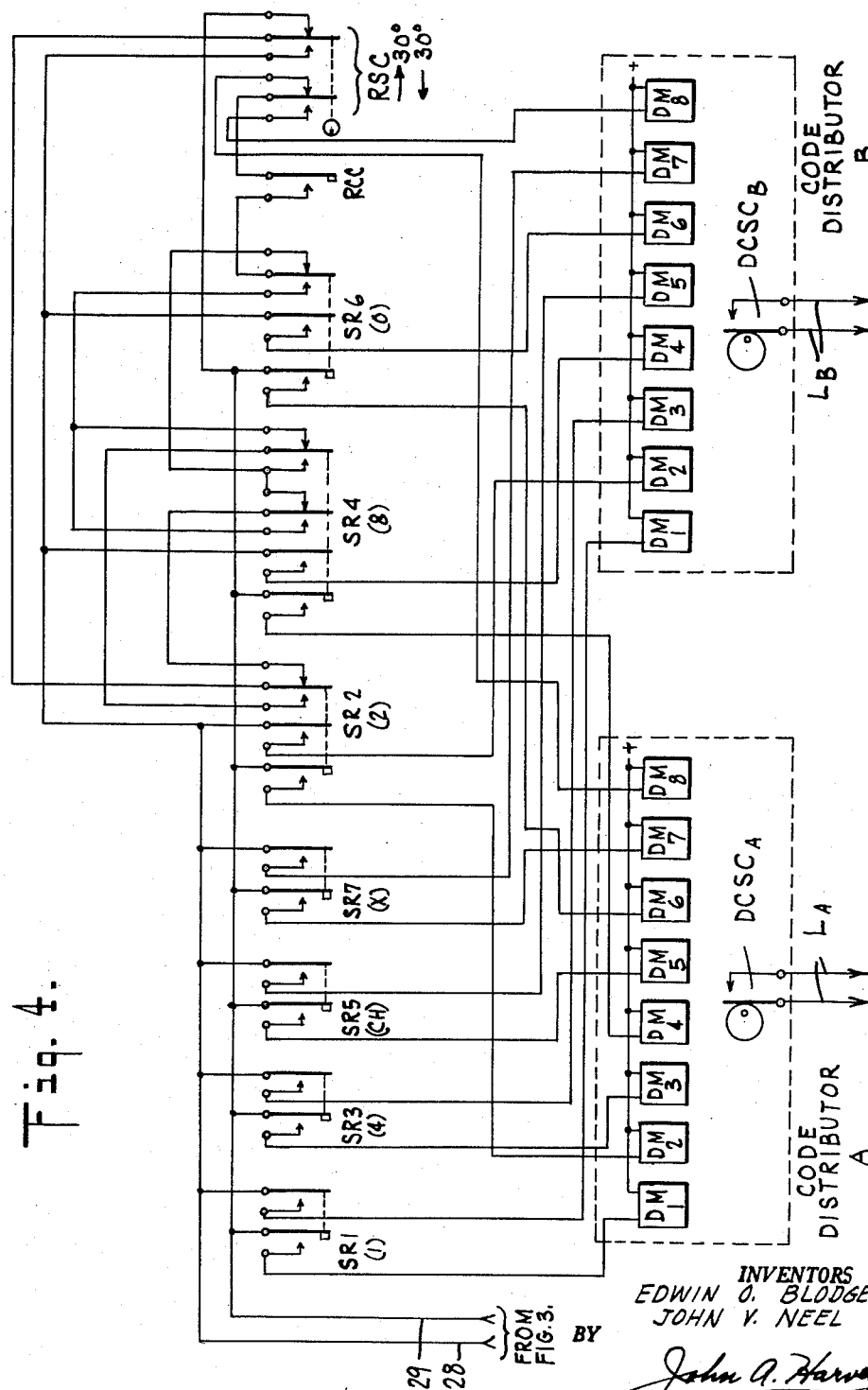
FIG. 4 is a circuit diagram illustrating the manner in which a single code reader supplies coded information alternately to two code transmitters or distributors for transmission.

FIG. 4 shows the electrical arrangement of the tape reader contact assemblies SR1-SR7 which are actuated by individual ones of the reader pins in the manner shown and described in the aforementioned Blodgett Patent No. 2,927,158. FIG. 4 also shows the manner in which individual contacts of these assemblies energize the code magnets DM1-DM7 of the A distributor whenever the output circuit 29 of the A distributor is energized or the manner in which other contacts of these assemblies energize the code magnets DM1-DM7 of the B distributor whenever the output circuit 28 of the B distributor is energized. The reader contact assemblies SR2, SR4 and SR6 include additional transfer contacts which, with a read selector contact RSC, effect energization of an 8th level code magnet DM8 of the A and B distributors according to the odd parity of the 2-4-6 sub-group of code bits corresponding to the SR2, SR4 and SR6 reader contact assemblies. The entire group comprising a total of seven code bits is also selected to have odd parity by utilizing the fifth level code bit corresponding to the reader contact assembly SR5 as an odd parity redundancy code bit. In other words, if the total number of code bits in a code-bit group corresponding to the contacts assemblies SR1-SR4, SR6 and SR7 is odd, no code bit corresponding to the contact assembly SR5 is used, whereas if the total number of code bits corresponding to the contact assemblies SR1-SR4, SR6 and SR7 is even there will be a code bit corresponding to the contact assembly SR5 so that the total number of code bits in each code-bit group including the redundancy code bit will have odd number.

The reader selector contacts RSC transfer at 30° of successive reader cycles as earlier explained and in dependence upon the even parity of the core bits corresponding to the reader contact assemblies SR2, SR4, and SR6 complete an electrical circuit to the A distributor code magnet DM8 when the A distributor output circuit 29 is energized, or upon transferring at 30° of the next reader cycle may again in dependence on even parity of the code bit sub-group corresponding to the reader contact assemblies SR2, SR4 and SR6 complete an electrical circuit to the B distributor code magnet DM8 when the B distributor output circuit 28 is energized. In other words, when the A distributor code magnets are energized in a given reader cycle the electrical interconnections of the reader contact assemblies SR2, SR4 and SR6 are such that the A distributor code magnet DM8 is energized if the total number of code bits in the code bit sub-group corresponding to these reader contact assemblies is even. Accordingly the 8th level code bit as thus generated and transmitted provides parity information insuring that the total number of code bits in the 2-4-6 code-bit sub-group including the eighth level redundancy code bit shall always be odd. This is likewise true with respect to the energization of the code magnet DM8 of the B distributor as will be evident from inspection.

Thus each code-bit group transmitted includes dual redundancy check bits, one being the fifth code level bit corresponding to the reader contact assembly SR5 and applicable to the total number of code bits in the group whereas the other eigth level redundancy bit transmitted is applicable only to the 2-4-6 sub-group of code bits corresponding to the reader contact assemblies SR2, SR4 and SR6. A suitable code for use in the system herein described may be that shown in the Blodgett et al Patent No. 2,905,298, and the reader contact assemblies of FIG. 4 have parenthetical binary-valued reference numerals and alphabetic characters corresponding to those used in association with the reader contact assemblies of the latter patent. The code employed in this patent uses an eighth level code bit (corresponding to the "EL" code bit of the reader contact assembly RC8 of the patent) to denote an end of line function code which, when read by the tape reader of the Blodgett et al. patent, causes an automatic carriage return operation of the typewriter. The tape reader of the present system may read a punched tape employing an eight level code such as shown in the Blodgett et al. patent last mentioned, but includes no eighth level code hole sensing pin or corresponding eighth level contact assembly. Nevertheless the eighth level code bit is transmitted by the present system by automatically converting it to an eighth level code-bit sub-group redundancy bit. That is, should an eighth level carriage return code appear in the tape read by the tape reader of the present system, there will be no code bits corresponding to the reader contact assemblies SR2, SR4 and SR6 and by reason of this fact the code magnet DM8 of the A or B distributor would be energized to maintain odd parity of the SR2, SR4 and SR6 code bit sub-group.

Figure 5:
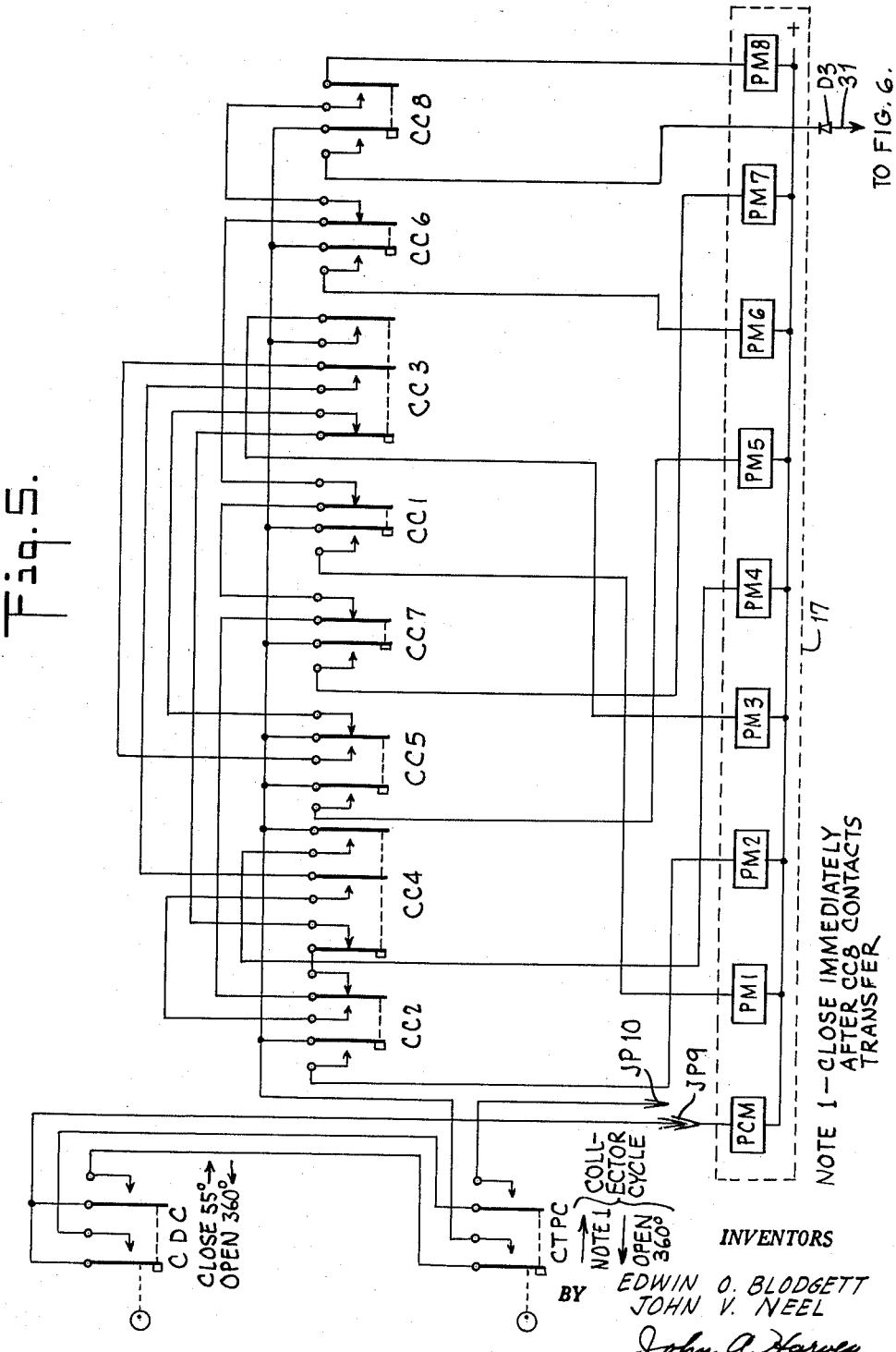
FIG. 5 is a circuit diagram illustrating the manner in which received coded-information is supplied to a punched tape recorder by a representative one of two coded-information receivers or collectors.

Each of the code collectors 15 and 16 (and 23 and 24) of FIG. 1 has, as earlier noted, the construction and operation generally shown in the aforementioned Blodgett telecommunications patent and includes code contact assemblies as shown in FIG. 5. There are, however, eight code collector contact assemblies CC1–CC8 used in the code collectors of the present system, and one pair of contacts of each of the assemblies CC1–CC7 directly energizes corresponding individual ones of the punch code magnets PM1–PM7 of the tape punch unit 17 as shown. The eighth level code punch magnet PM8 is energized as shown through contacts of the contact assemblies CC1–CC8, whereby the punch code magnet PM8 is energized when only an eighth level code corresponding to the contact assembly CC8 is received or when an alternate carriage return code 2-3-4-5-8 (these code bits corresponding to the respective contact assemblies CC2, CC3, CC4, CC5 and CC8) is received. In regard to the latter carriage return code, it may be noted that the appearance of the second and fourth level code bits alone occur in the code-bit sub-group for which the eighth level code bit is then automatically generated and transmitted to maintain odd parity for the sub-group. It will be noted in connection with this alternative carriage return code that all of the 2-3-4-5-8 code bits must be received before the punch code magnet PM8 is energized since the receipt of merely the 2-4-8 code bits alone (to maintain odd parity of the code sub-group which includes the 2 and 4 code bits) does not effect energization of the punch code magnet PM8.

The punch clutch magnet PCM is energized through the collector cam-actuated contacts CDC and collector cam-actuated contacts CTPC by minus potential received through a plug receptacle JP10 (shown in the Blodgett telecommunications patent) and applied to the punch clutch magnet through a plug receptacle JP9 (also shown in the latter patent). The collector contacts CDC and CTPC also energize the contact assemblies CC1–CC8 from immediately after the contact assembly CC8 has been set by the collector until 360° of the collector cycle at which time the collector cam-actuated contacts CDC and CTPC both open. As earlier explained, the tape punch 17 has its punch clutch magnet PCM and punch code magnets PM1–PM8 energized alternately from A' and B' (or A and B) collectors, and the fact that each collector removes energization from the punch clutch magnet PCM and punch code magnets PM1–PM8 precisely at 360° of the collector cycle permits both collectors to be directly connected to the punch clutch magnet PCM and punch code magnets PM1–PM8 in the same manner as that shown in FIG. 5. As noted above, the eighth level code bit corresponding to the collector contact assembly CC8 furnishes odd redundancy parity information for the 2-4-6 code-bit sub-group. Accordingly, contacts of the contact assembly CC8 energize an output circuit 31 through a diode rectifier D3 as shown and for a purpose which will now be considered in connection with the parity check contact arrangement.

Figure 6:
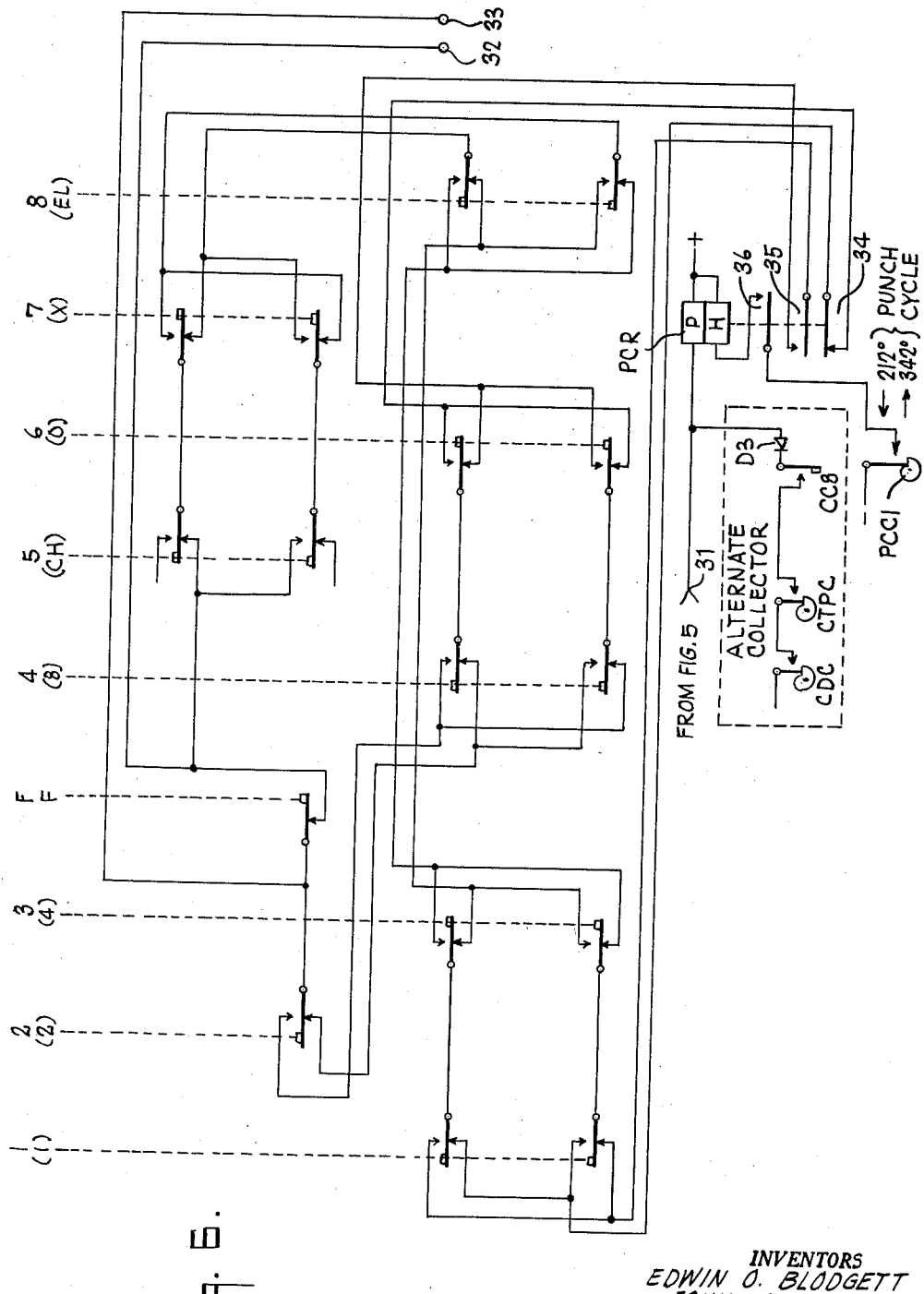
FIG. 6 is a circuit diagram showing the electrical interconnections of a plurality of recorder and relay actuated electrical contacts by which dual parity standards of the received coded-information are continuously monitored by the recorder of the system.

The parity check contact arrangement is comprised of a plurality of contact assemblies actuated by individual ones of the punch pins of the tape punch in the manner shown and described in the Blodgett Patent No. 2,927,158. The electrical interconnections of these contact assemblies are shown in FIG. 6 and include a first output terminal 32, which extends to the punch tape contacts PTC shown in the aforementioned Blodgett telecommunications patent, and a second output terminal 33 which extends to the plug receptacle JP14 of the latter patent. Electrical continuity between the output terminals 32 and 33 completes the hold circuit for the parity error relay PER as earlier explained in connection with FIG. 2. The electrical interconnections of these contact assemblies also includes normally closed contacts 34 and normally open contacts 35 of a parity check relay PCR. The contacts 34 cause the contact assemblies to maintain electrical continuity between the output terminals 32 and 33 when (1) the total number of code bits in a code-bit group recorded by the tape punch is odd and (2) the number of code bits in the 2-4-6 code-bit sub-group is also odd. Whenever the number of code bits in the latter code-bit sub-group is even so that an eighth level parity redundancy code bit is transmitted for purposes of maintaining odd parity of the sub-group, the energized output circuit 31 of the code collector last described energizes the parity check relay PCR to open its contacts 34 and close its contacts 35. This energization of the relay PCR so changes the electrical interconnections of the contact assemblies that electrical continuity is maintained between the output terminals 32 and 33 when (1) the total number of code bits in the received and recorded code-bit group is odd and (2) there are also an even number of 2-4-6 code bits in the 2-4-6 code-bit sub-group (even though the eighth level code bit may not be recorded by energization of the punch code magnet PM8 as described in connection with FIG. 5).

Thus the parity contact assembly maintains continuous monitoring over the concurrent odd parity of the code-bit group as a whole and the even or odd parity of the code-bit sub-group used in a particular code-bit group. The parity check relay PCR includes hold contacts 36 which maintain this relay energized through the punch cam-actuated contacts PCC1 from 342° of one punch cycle to 212° of the next punch cycle. Accordingly, the relay PCR when energized at the outset of a given punch cycle remains energized to 212° of that punch cycle but is thereupon deenergized by the punch cam actuated contacts PCC1 so that the relay PCR must be newly energized for the next punch cycle if such energization is required in the monitoring of the code-bit sub-group parity.

As indicated in FIG. 6, the parity check relay PCR is also energized by the other code collector used in the system, this energizing circuit including a diode rectifier D3, the code collector contact assembly CC8 of the other collector, and the cam-actuated contacts CTPC and CDC of such other collector as indicated.

The construction and operation of the tape reader used in the present system is, except for the addition thereto of the reader selector contacts RSC earlier mentioned, shown and described in the Blodgett Patent No. 2,927,158. FIG. 7 is a side elevational view illustrating the tape reader and, in conjunction with FIGS. 8-10, shows the manner in which the reader selector contacts RSC are supported and actuated. As more clearly shown in FIG. 7, the reader selector contacts RSC are supported upon a bracket 40 secured to a bracket 41 supported upon a back plate 42. A stud shaft 43, mounted at the end of an upstanding arm 44 of the bracket 40, rotatably supports a gear 45 and an integral cam 46. As shown in FIGS. 8 and 10, the gear 45 drivingly engages a pinion gear 47 fixed by a pin 48 to the power driven shaft 49 of the reader. The shaft 49 is motor driven through a 180° clutch and effects the cyclically controlled operation of the tape reader as explained in the patent last mentioned. A cam follower roller 50 is mounted intermediate the ends of a follower arm 51 pivoted to the frame 40 by a stud shaft 52, and engagement of the roller 50 with the cam 46 angularly reciprocates the follower arm 51 to effect transfer operation of the reader selector contacts RSC which are mechanically connected to the arm through electrical insulating link members 53. The resilient bias of the movable contact arms of the contacts RSC maintain the follower roller 50 biased against the cam 46. The gear 45 and its driving pinion gear 47 have a two-to-one gear ratio so that the cam 46 makes one complete revolution for each two complete reader cycles, whereby the reader selector contacts RSC are caused to transfer forwardly at 30° of one reader cycle and rearwardly at 30° of the next reader cycle.

Figure 11:
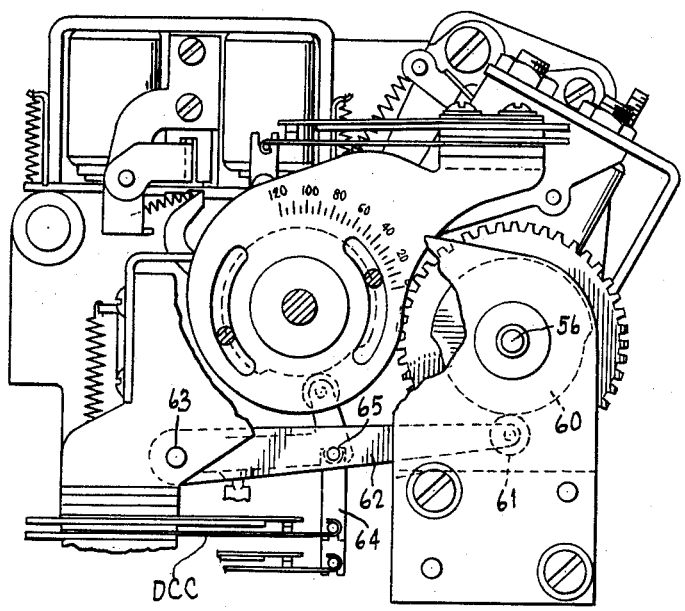
FIGS. 11 and 12 illustrate the construction of certain described control contacts used in the coded-information tranmitter or distributor of the system.
Figure 12:
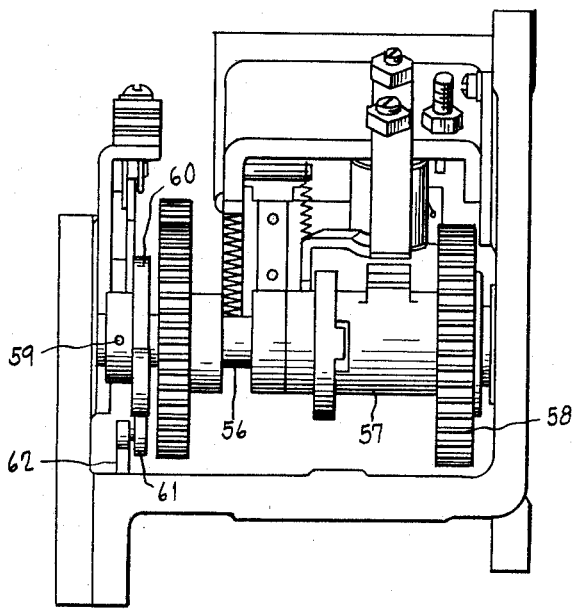

The construction and operation of the code distributor utilized in the present system is, as earlier mentioned, shown and described in the aforementioned Blodgett telecommunications patent. FIGS. 11 and 12 are side and end elevational views of the distributor and particularly illustrate the manner in which the distributor contacts DCC are supported and actuated. The distributor includes a shaft 56 which is coupled through a helical spring clutch 57 to a motor driven gear 58 which, as explained in the latter Blodgett patent, drives a sleeve internally of the clutch 57 and about which the clutch spring is wound. Fixedly secured on the shaft 56 by a pin 59 is a cam 60 which is engaged by a cam follower roller 61 supported on the end of a cam follower arm 62 pivoted on a shaft 63. The contacts DCC are mechanically connected by an electrically insulating link member 64 to a pin 65 centrally positioned on the cam follower arm 62, the resilient bias of the movable contact of the contacts DCC maintaining the cam follower roller 61 in engagement with the cam 60. As previously noted, the configuration of the cam 60 is such that the contacts DCC are opened at 24° of each reader cycle and are permitted to close at 150° of that reader cycle.

It will be apparent from the foregoing description of the invention that a coded-information translation system embodying the invention is characterized by unique and important advantages. Among these are the ability of the system not only to translate information represented by code-bit groups through transmission channels having relatively narrow frequency band width, and with the code bits transmitted sequentially as is desirable from the standpoints of economy and equipment simplicity, but to accomplish this with a rate of information translation substantially higher than heretofore readily accomplished by cyclically operating mechanical equipments and one utilizing the maximum code translation speed of each unit of equipment in the system. There is the further advantage that each code-bit group so translated is subject to a double parity check for accuracy of translation, one parity check being applicable to the total number of code bits in each code-bit group and the other parity check being applicable to a sub-group of code bits evenly spaced through the code-bit group. This dual parity check substantially insures against error of translation, such as may be caused by electrical disturbances or transient interruptions of the communication channel or by other operating conditions tending to insert one or more spurious code bits into a translated code group or delete one or more code bits from the translated group. A translation system embodying the invention has the important operating characteristic that detection of parity error in any of plural translation channels effects automatic halt of further code translations in all channels.

While a specific form of invention has been described for purposes of illustration, it is contemplated that numerous changes may be made without departing from the spirit of the invention.

What is claimed is:

1. A coded information translation system comprising cyclically operating means for deriving successive combinational groups of parallel-presented binary code bits each representing an item of information, at least two code transmitters each coupled to an individual transmission channel and having a cyclic operation during which a code-bit group is transmitted over said individual channel, means controlled by said first-mentioned means for supplying successive ones of said derived code-bit groups alternately to said transmitters and for concurrently initiating a corresponding cycle of transmitter operation to transmit successive code-bit groups over alternate ones of said transmission channels, and means coupled to said channels for receiving and utilizing in combined relation the successive and alternate code-bit groups transmitted over said channels.

2. A coded information translation system comprising means for reading a record medium to derive therefrom successive combinational groups of parallel-presented binary code bits each representing an item of information, at least two code transmitters each coupled to an individual transmission channel and having a cyclic operation during which a code-bit group is transmitted over said individual channel, means controlled by said reading means for supplying successive ones of said code-bit groups alternately to said transmiters and for concurrently initiating a corresponding cycle of transmitter operation to transmit successive code-bit groups over alternate ones of said transmission channels, at least two receivers coupled to individual ones of said channels to receive the successive code-bit groups transmitted over said channels, and cyclically operating information recording means coupled in common to said receivers and having each cycle of operation individually controlled thereby for recording successive code-bit groups received alternately from said receivers.

3. A coded information translation system comprising means for reading a record medium to derive therefrom successive combinational groups of parallel-presented binary code bits each representing an item of information, at least two code transmitters each coupled to an individual transmission channel and having a cyclic operation during which a code-bit group is transmitted over said individual channel, means controlled by said reading means for supplying successive ones of said code-bit groups selectively and alternately to said transmitters and responsive to a preselected cyclic state of the non-selected one of said transmitters for concurrently initiating a corresponding cycle of the selected transmitter operation to transmit successive code-bit groups over alternate ones of said transmission channels, and means coupled to said channels for receiving and utilizing in combined relation the successive and alternate code-bit groups transmitted over said channels.

4. A coded information translation system comprising cyclically operating means for reading a record medium to derive therefrom successive combinational groups of parallel-presented binary code bits each representing an item of information, at least two code transmitters each coupled to an individual transmission channel and having a cyclic operation during which a code-bit group is transmitted over said individual channel, means controlled by said reading means for supplying successive ones of said code-bit groups selectively and alternately to said transmitters and responsive to a preselected cyclic state of the non-selected one of said transmitters for concurrently initiating a corresponding cycle of the selected transmitter operation to transmit successive code-bit groups over alternate ones of said transmission channels, means responsive to the initiation of a cycle of operation of each said transmitters for initiating a cycle of operation of said reading means, and means coupled to said channels for receiving and utilizing in combined relation the successive and alternate code-bit groups transmitted over said channels.

5. A coded information translation system comprising means for reading a record medium and having a cyclic operation controllable cycle by cycle to derive from said medium and temporarily store during each said cycle each of successive combinational groups of parallel-presented binary code bits each representing an item of information, at least two code transmitters each coupled to an individual transmission channel and having a cyclic operation during which a code-bit group is transmitted over said individual channel, means controlled by reading means for supplying successive ones of said code-bit groups selectively and alternately to said transmitters and responsive to substantial completion of any previous cycle of operation of the non-selected one of said transmitters for concurrently initiating a corresponding cycle of the selected transmitter operation to transmit successive code-bit groups over alternate ones of said transmission channels, means responsive to the partial completion of a cycle of operation of each said selected transmitter for controlling said reading means to initiate a further cycle of operation thereof and means coupled to said channels for receiving and utilizing in combined relation the successive and alternate code-bit groups transmitted over said channels.

6. A coded information translation system comprising cyclic operating reading means including plural electrical contact assemblies each having pairs of contacts corresponding to individual code bits of combinational groups of parallel-presented binary code bits, means for moving a record medium through said reading means to derive from said medium successive code-bit groups recorded therein as representative of successive information items, at least two code transmitters each coupled to an individual transmission channel and having a cyclic operation during which a code-bit group is transmitted over said individual channel, means responsive to successive cycles of said reading means for alternately energizing said pairs of contacts of said contact assemblies to supply successive ones of said code-bit groups derived from said medium alternately to said transmitters and for concurrently initiating a corresponding cycle of transmitter operation to transmit successive code-bit groups over alternate ones of said transmission channels, and means coupled to said channels for receiving and utilizing in combined relation the successive and alternate code-bit groups transmitted over said channels.

7. A coded information translation system comprising cyclically operating means for deriving successive combinational groups of parallel-presented binary code bits each representing an item of information, control means having two operative states and responsive to the cyclic operation of said first-mentioned means for alternating between said states during successive cycles of said first-mentioned means, at least two code transmitters each coupled to an individual transmission channel and having a cyclic operation during which a code-bit group is transmitted over said individual channel, means controlled by said control means for supplying successive ones of said derived code-bit groups alternately to said transmitters and for concurrently initiating a corresponding cycle of transmitter operation to transmit successive code-bit groups over alternate ones of said transmission channels, and means coupled to said channels for receiving and utilizing in combined relation the successive and alternate code-bit groups transmitted over said channels.

8. A coded information translation system comprising cyclically operating means for reading a record medium to derive therefrom successive combinational groups of parallel-presented binary code bits each representing an item of information, control means having two operative states and responsive to the cyclic operation of said reading means for alternating between said states during successive cycles of said reading means, at least two code transmitters each coupled to an individual transmission channel and having a cyclic operation during which a code-bit group is transmitted over said individual channel, means controlled by said control means for supplying successive ones of said derived code-bit groups alternately to said transmitters and for concurrently initiating a corresponding cycle of transmitter operation to transmit successive code-bit groups over alternate ones of said transmission channels, and means coupled to said channels for receiving and utilizing in combined relation the successive and alternate code-bit groups transmitted over said channels.

9. A coded information translation system comprising cyclically operating means for reading a record medium to derive therefrom in each of two sets of electrical contacts successive combinational groups of parallel-presented binary code bits each representing an item of information, control means having two operative states and responsive to the cyclic operation of said reading means for alternating between said states during successive cycles of said reading means, at least two code transmitters each coupled to an individual set of said electrical contacts and to an individual transmission channel and having a cyclic operation during which a code-bit group is transmitted over said individual channel, means controlled by said control means for alternately energizing said sets of electrical contacts to supply successive ones of said derived code-bit groups alternately to said transmitters and for concurrently initiating a corresponding cycle of transmitter operation to transmit successive code-bit groups over alternate ones of said transmission channels, and means coupled to said channels for receiving and utilizing in combined relation the successive and alternate code-bit groups transmitted over said channels.

10. A coded information translation system comprising cyclically operating means for reading a record medium to derive therefrom successive combinational groups of parallel-presented binary code bits each representing an item of information, control means having two operative states and responsive to the attainment of a preselected point in each cycle of said reading means for alternating between said states with successive cycles of said reading means, at least two code transmitters each coupled to an individual transmisison channel and having a cyclic operation during which a code-bit group is transmitted over said individual channel, means controlled by said control means and responsive to the attainment of a further preselected point in each cycle of said reading means for supplying successive ones of said derived code-bit groups alternately to said transmitters and for concurrently initiating a corresponding cycle of transmitter operation to transmit successive code-bit groups over alternate ones of said transmisison channels, and means coupled to said channels for receiving and utilizing in combined relation the successive and alternate code-bit groups transmitted over said channels.

11. A coded information translation system comprising cyclically operating means for reading a record medium to derive therefrom in each of two sets of electrical contacts successive combinational groups of parallel-presented binary code bits each representing an item of information, cyclic control means for halting said reading means at a code-reading intermediate cyclic position thereof temporarily to retain in said contacts each said derived code-bit group, control means having two operative states and responsive to the cyclic operation of said reading means for alternating between said states during successive cycles of said reading means, at least two code transmitters each coupled to an individual set of said electrical contacts and to an individual transmission channel and having a cyclic operation during which said cyclic control means is actuated to release said reading means past said intermediate cyclic position thereof and a code-bit group is transmitted over said individual channel, means controlled by said control means for alternately energizing said sets of electrical contacts to supply successive ones of said derived code-bit groups alternately to said transmitters and for concurrently initiating a corresponding cycle of transmitter operation to transmit successive code-bit groups over alternate ones of said transmission channels, and means coupled to said channels for receiving and utilizing in combined relation the successive and alternate code-bit groups transmitted over said channels.

12. A coded information translation system comprising cyclically operating means for reading a record medium to derive therefrom successive combinational groups of parallel-presented binary code bits each representing an item of information, cyclic control means for halting said reading means at a code-reading intermediate cyclic position thereof temporarily to preserve each said derived code-bit group, control means having two operative states and responsive to the cyclic operation of said reading means for alternating between said states during successive cycles of said reading means, at least two code transmitters each coupled to an individual transmission channel and having a cyclic operation during which said cyclic control means is actuated to release said reading means past said intermediate cyclic position thereof and a code-bit group is transmitted over said individual channel, means included in each transmitter for limiting the initiation of a cycle of operation of the other of said transmitters to approximately the last half cycle including the zero cyclic position of said each transmitter, means controlled by said control means for supplying successive ones of said derived code-bit groups alternately to said transmitters and for concurrently initiating under control of said last-named means a corresponding cycle of transmitter operation to transmit successive code-bit groups over alternate ones of said transmission channels, and means coupled to said channels for receiving and utilizing in combined relation the successive and alternate code-bit groups transmitted over said channels.

13. A coded information translation system comprising cyclically operating means having two sets of electrical contacts for reading a record medium to derive therefrom and temporarily store in said contacts successive combinational groups of parallel-presented binary code bits each representing an item of information, cyclic control means for halting said reading means at a code-reading intermediate cyclic position thereof temporarily to preserve the storage of each said derived code-bit group in said contacts, control means having two operative states and responsive to the cyclic operation of said reading means for alternating between said states during successive cycles of said reading means, at least two code transmitters each coupled to an individual set of said contacts and to an individual transmission channel and having a cyclic operation during which said cyclic control means is actuated to release said reading means past said intermediate cyclic position thereof and a code-bit group is transmitted over said individual channel, means included in each transmitter for limiting the initiation of a cycle of operation of the other of said transmitters to approximately the last half cycle including the zero cyclic position of said each transmitter, means controlled by said control means for alternately energizing said sets of electrical controls to supply successive ones of said derived code-bit groups alternately to said transmitters and for concurrently initiating under control of said last-named means a corresponding cycle of transmitter operation to transmit successive code-bit groups over alternate ones of said transmission channels, and means coupled to said channels for receiving and utilizing in combined relation the successive and alternate code-bit groups transmitted over said channels.

14. A coded information translation system comprising cyclically operating means for reading a record medium to derive therefrom successive combinational groups of parallel-presented binary code bits each representing an item of information, control means having two operative states and responsive to the cyclic operation of said reading means for alternating between said states during successive cycles of said reading means, at least two code transmitters each coupled to an individual transmission channel and having a cyclic operation during which a code-bit group is transmitted in sequential code bit form over said individual channel, means controlled by said control means for supplying successive ones of said derived code-bit groups alternately to said transmitters and for concurrently initiating a corresponding cycle of transmitter operation to transmit successive code-bit groups over alternate ones of said transmission channels, and means coupled to said channels for receiving and collecting the sequentially transmitted code bits and for utilizing in combined relation and in parallel code bit form the successive and alternate code-bit groups transmitted over said channels.

15. A coded information translation system comprising cyclically operating means for reading a record medium to derive therefrom successive combinational groups of parallel-presented binary code bits each representing an item of information and each containing group parity information, means responsive to the presence and absence of code bits in a preselected subgroup of each code-bit group for generating parity information applicable to each said sub-group, at least two code transmitters each coupled to an individual transmission channel and having a cyclic operation during which a code-bit group including its group and subgroup parity information is transmitted over said individual channel, means controlled by said reading means for supplying successive ones of said derived code-bit groups and the group and sub-group parity information applicable thereto alternately to said transmitters and for concurrently initiating a corresopnding cycle of transmitter operation to transmit successive code-bit groups and associated said parity information over alternate ones of said transmission channels, means coupled to said channels for receiving and utilizing in combined relation the successive and alternate code-bit groups transmitted over said channels, and means for continuously monitoring the group and sub-group parity information applicable to each utilized code-bit group and for providing an error indication upon detection of any group or sub-group parity error.

16. A coded information translation system comprising cyclically operating means for reading a record medium to derive therefrom successive combinational groups of parallel-presented binary code bits each representing an item of information and each containing group parity information, means responsive to the presence and absence of code bits in a preselected sub-group of each code-bit group for generating parity information applicable to each said sub-group, at least two code transmitters each coupled to an individual transmission channel and having a cyclic operation during which a code-bit group including its group and sub-group parity information is transmitted over said individual channel, means controlled by said reading means for supplying successive ones of said derived code-bit groups and the group and sub-group parity information applicable thereto alternately to said transmitters and for concurrently initiating a corresponding cycle of transmitter operation to transmit successive code-bit groups and associated said parity information over alternate ones of said transmission channels, means coupled to said channels for receiving and utilizing in combined relation the successive and alternate code-bit groups transmitted over said channels, and means for continuously monitoring the group and sub-group parity information applicable to each utilized code-bit group and for providing an error indication upon detection of any group or sub-group parity error.

17. A coded information translation system comprising cyclically operating means for reading a record medium to derive therefrom successive combinational groups of parallel-presented binary code bits each representing an item of information and each containing group parity information, means responsive to the presence and absence of code bits in a preselected sub-group of each code-bit group for generating parity information applicable to each said sub-group, at least two code transmitters each coupled to an individual transmission channel and having a cyclic operation during which a code-bit group including its group and sub-group parity information is transmitted over said individual channel, means controlled by said reading means for supplying successive ones of said derived code-bit groups and the group and sub-group parity information applicable thereto alternately to said transmitters and for concurrently initiating a corresponding cycle of transmitter operation to transmit successive code-bit groups and associated said parity information over alternate ones of said transmission channels, means coupled to said channels for receiving and utilizing in combined relation the successive and alternate code-bit groups transmitted over said channels, and means for continuously monitoring the group and sub-group parity information applicable to each utilized code-bit group and for halting the operation of said reading means upon detection of any group or sub-group parity error.

18. A coded information translation system comprising cyclically operating means for reading a record medium to derive therefrom successive combinational groups of parallel-presented binary code bits each representing an item of information and each containing a code bit providing group parity information, means responsive to the presence and absence of code bits in a preselected sub-group of each code-bit group for generating a parity information code bit applicable to each said sub-group, at least two code transmitters each coupled to an individual transmission channel and having a cyclic operation during which a code-bit group including its group and sub-group parity information code bits are transmitted over said individual channel, means controlled by said reading means for supplying successive ones of said derived code-bit groups and the group and sub-group parity information code bits applicable thereto alternately to said transmitters and for concurrently initiating a corresponding cycle of transmitter operation to transmit successive code-bit groups and associated parity information code bits over alternate ones of said transmission channels, means coupled to said channels for receiving and utilizing in combined relation the successive and alternate code-bit groups transmitted over said channels, and means including an electrically interconnected system of electrical contacts actuated in code-bit group relationships by said utilizing means for continuously monitoring the group and sub-group parity information provided by said parity code bits of each utilized code-bit group and for providing an error indication upon detection of any group or sub-group parity error.

19. A coded information translation system comprising cyclically operating means for reading a record medium to derive therefrom successive combinational groups of parallel-presented binary code bits each representing an item of information and each containing a code bit providing group parity information, means responsive to the presence and absence of code bits in a preselected sub-group of each code-bit group for generating a parity information code-bit applicable to each said sub-group, at least two code transmitters each coupled to an individual transmission channel and having a cyclic operation during which a code-bit group including its group and sub-group parity information code bits are transmitted over said individual channel, means controlled by said reading means for supplying successive ones of said derived code-bit groups and the group and sub-group parity information code bits applicable thereto alternately to said transmitters and for concurrently initiating a corresponding cycle of transmitter operation to transmit successive code-bit groups and associated said parity information code bits over alternate ones of said transmission channels, means coupled to said channels for receiving and utilizing in combined relation the successive and alternate code-bit groups transmitted over said channels, electrical circuit control means actuated in response to each received sub-group parity information code bit, and means including a plurality of electrical contacts actuated in code-bit group relationships by said utilizing means and having electrical interconnections controlled by the actuated and deactuated states of said electrical circuit control means for continuously monitoring the group and sub-group parity information provided by said parity code bits of each utilized code-bit group and for providing an error indication upon detection of any group or sub-group parity error.

20. A coded information translation system comprising cyclically operating means for reading a record medium to derive therefrom successive combinational groups of parallel-presented binary code bits each representing an item of information and each containing a redundancy bit the presence and absence of which maintains odd parity for the code-bit group, means responsive to the presence and absence of code bits in a preselected sub-group of each code-bit group for generating a redundancy bit which maintains odd parity for each said sub-group, at least two code transmitters each coupled to an individual transmission channel and having a cyclic operation during which a code-bit group including its group and sub-group redundancy bits are transmitted over said individual channel, means controlled by said reading means for supplying successive ones of said derived code-bit groups and the group and sub-group redundancy bits applicable thereto alternately to said transmitters and for concurrently initiating a corresponding cycle of transmitter operation to transmit successive code-bit groups and associated redundancy bits over alternate ones of said transmission channels, means coupled to said channels for receiving and utilizing in combined relation the successive and alternate code-bit groups transmitted over said channels, an electrical relay actuated by each received sub-group redundancy bit and including relay circuit control electrical contacts, a plurality of electrical contacts actuated in code-bit group relationships by said utilizing means and having electrical interconnections which include said relay contacts and are so modified thereby according to the energized and deenergized state of said relay that an electrically continuous circuit is maintained through said contacts only for concurrent odd parity of both the utilized code-bit group and utilized code-bit sub-group, and means responsive to interruption of the continuity of said contact circuit for providing an error indication.

References Cited in the file of this patent

UNITED STATES PATENTS

| | | |
|---|---|---|
| 2,640,914 | Potts | June 2, 1953 |
| 2,713,084 | Berwin | July 12, 1953 |

FOREIGN PATENTS

| | | |
|---|---|---|
| 721,191 | Great Britain | Jan. 5, 1955 |